(12) United States Patent
Rainisto (10) Patent No.: US 9,990,037 B1
(45) Date of Patent: *Jun. 5, 2018

(54) DISPLAY APPARATUS AND METHOD USING PORTABLE ELECTRONIC DEVICE

(71) Applicant: Varjo Technologies Oy, Helsinki (FI)

(72) Inventor: Roope Rainisto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/623,052

(22) Filed: Jun. 14, 2017

Related U.S. Application Data (63) Continuation-in-part of application No. 15/366,424, filed on Dec. 1, 2016, now Pat. No. 9,711,072.

(51) Int. Cl.
| | | |
|---|---|---|
| *G09G 1/00* | (2006.01) | |
| *G06F 3/01* | (2006.01) | |
| *G09G 5/391* | (2006.01) | |
| *G02B 7/04* | (2006.01) | |

(52) U.S. Cl.
CPC .............. *G06F 3/013* (2013.01); *G02B 7/04* (2013.01); *G09G 5/391* (2013.01)

(58) Field of Classification Search
CPC ..... G06T 19/006; G06T 19/20; G06T 15/503; G06F 3/013
See application file for complete search history.

(56) References Cited

U.S. PATENT DOCUMENTS

| | | |
|---|---|---|
| 6,226,122 B1 | 5/2001 | Sugawara |
| 2010/0079356 A1 | 4/2010 | Hoellwarth |
| 2012/0287331 A1 | 11/2012 | Iwane |
| 2016/0150201 A1 | 5/2016 | Kilcher et al. |
| 2016/0240013 A1* | 8/2016 | Spitzer .................... G06F 3/013 |
| 2016/0267713 A1 | 9/2016 | Patel |
| 2016/0342840 A1* | 11/2016 | Mullins .............. G06K 9/00671 |

FOREIGN PATENT DOCUMENTS

| | | |
|---|---|---|
| WO | 2015183621 A1 | 12/2015 |
| WO | 2016130941 A1 | 8/2016 |

OTHER PUBLICATIONS

United States Patent and Trademark Office, Office Action, U.S. Appl. No. 15/633,868, dated Aug. 24, 2017, 21 pages.
International Search Report and Written Opinion of the International Searching Authority; International Application No. PCT/FI2017/050824; dated Mar. 2, 2018; 13 pages.

* cited by examiner

*Primary Examiner* — Michael Faragalla
(74) *Attorney, Agent, or Firm* — Ziegler IP Law Group, LLC (57) ABSTRACT

A display apparatus and a method of displaying, via the display apparatus. The display apparatus includes at least one focus display, and a processor coupled to the at least one focus display. The processor of the display apparatus is configured to render a focus image at the at least one focus display. The display apparatus is arranged to be detachably attached to a portable electronic device and to be communicably coupled with the portable electronic device. A processor of the portable electronic device is configured to render a context image at a display of the portable electronic device. The projection of the rendered context image is combined with the projection of the rendered focus image to create a visual scene.

13 Claims, 3 Drawing Sheets

DISPLAY APPARATUS AND METHOD USING PORTABLE ELECTRONIC DEVICE

CROSS-REFERENCE TO RELATED APPLICATIONS

This application is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is incorporated herein by reference.

TECHNICAL FIELD

The present disclosure relates generally to virtual reality; and more specifically, to display apparatuses using portable electronic devices. Furthermore, the present disclosure also relates to methods of displaying, via the aforementioned display apparatuses.

BACKGROUND

In recent times, there has been rapid increase in use of technologies such as virtual reality, augmented reality, and so forth, for presenting a simulated environment (or a virtual world) to a user. Specifically, the simulated environment enhances the user's experience of reality around him/her by providing the user with a feeling of immersion in the simulated environment using contemporary techniques such as stereoscopy.

Typically, the user may use a device, such as a virtual reality device, for experiencing such simulated environment. Optionally, such virtual reality devices include near field displays. Examples of such virtual reality devices include, head mounted virtual reality devices, virtual reality glasses, and so forth. Furthermore, typically, the virtual reality devices include binocular virtual reality devices having one display per eye of the user. In such an instance, both displays of a binocular virtual reality device display different two-dimensional images (also known as stereograms) to the eyes of the user for creating an illusion of depth by combining the different two-dimensional images. However, conventional virtual reality devices have certain limitations. Firstly, the virtual reality devices are required to include high resolution displays to allow for provision of the feeling of immersion and better awareness of the simulated environment to the user. Consequently, the virtual reality devices comprising such sophisticated displays are expensive. Secondly, processors employed in conventional virtual reality devices often lack substantially advanced processing functionality to minimize processing latency therein. Consequently, a lag in processing reduces the user's experience of the simulated environment.

Therefore, in light of the foregoing discussion, there exists a need to overcome the aforementioned drawbacks associated with conventional virtual reality devices.

SUMMARY

The present disclosure seeks to provide a display apparatus, comprising at least one focus display, and a processor coupled to the at least one focus display, wherein the display apparatus is arranged to be detachably attached to a portable electronic device and to be communicably coupled to the portable electronic device. The present disclosure also seeks to provide a method of displaying, via such a display apparatus. The present disclosure seeks to provide a solution to the existing problem of expensive displays and significant processing latency within virtual reality devices. An aim of the present disclosure is to provide a solution that overcomes at least partially the problems encountered in the prior art, and provides a robust, efficient, and cost-effective display apparatus for the virtual reality devices.

In one aspect, an embodiment of the present disclosure provides a display apparatus comprising:
  at least one focus display; and
  a processor coupled to the at least one focus display, wherein the processor is configured to render a focus image at the at least one focus display, wherein an angular width of a projection of the rendered focus image ranges from 5 degrees to 60 degrees,
  wherein the display apparatus is arranged to be detachably attached to a portable electronic device and to be communicably coupled with the portable electronic device, and wherein a processor of the portable electronic device is configured to render a context image at a display of the portable electronic device, wherein an angular width of a projection of the rendered context image ranges from 40 degrees to 220 degrees,
  further wherein the projection of the rendered context image is combined with the projection of the rendered focus image to create a visual scene.

In another aspect, an embodiment of the present disclosure provides a method of displaying, via a display apparatus comprising at least one focus display, the display apparatus being detachably attached to a portable electronic device and being communicably coupled with the portable electronic device, the method comprising:
  rendering a focus image at the at least one focus display of the display apparatus, wherein an angular width of a projection of the rendered focus image ranges from 5 degrees to 60 degrees;
  rendering a context image at a display of the portable electronic device, wherein an angular width of a projection of the rendered context image ranges from 40 degrees to 220 degrees; and
  combining the projection of the rendered context image with the projection of the rendered focus image to create a visual scene.

Embodiments of the present disclosure substantially eliminate or at least partially address the aforementioned problems in the prior art, and enables minimization of processing latency within virtual reality devices, thereby, enhancing a user's experience of simulated environments presented by such virtual reality devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  at least one focus display; and
  a processor coupled to the at least one focus display, wherein the processor is configured to render a focus image at the at least one focus display, wherein an angular width of a projection of the rendered focus image ranges from 5 degrees to 60 degrees,
  wherein the display apparatus is arranged to be detachably attached to a portable electronic device and to be communicably coupled with the portable electronic device, and wherein a processor of the portable electronic device is configured to render a context image at a display of the portable electronic device, wherein an angular width of a projection of the rendered context image ranges from 40 degrees to 220 degrees,
  further wherein the projection of the rendered context image is combined with the projection of the rendered focus image to create a visual scene.

In another aspect, an embodiment of the present disclosure provides a method of displaying, via a display apparatus comprising at least one focus display, the display apparatus being detachably attached to a portable electronic device and being communicably coupled with the portable electronic device, the method comprising:
  rendering a focus image at the at least one focus display of the display apparatus, wherein an angular width of a projection of the rendered focus image ranges from 5 degrees to 60 degrees;
  rendering a context image at a display of the portable electronic device, wherein an angular width of a projection of the rendered context image ranges from 40 degrees to 220 degrees; and
  combining the projection of the rendered context image with the projection of the rendered focus image to create a visual scene.

The present disclosure provides the aforementioned display apparatus and the aforementioned method of displaying via the display apparatus. The display apparatus described herein is robust, light-weight and cost-effective. Furthermore, since processing functionality (namely, processing burden) is shared between the processors of the display apparatus and the portable electronic device, processing latency in rendering a simulated environment is reduced significantly. Consequently, such minimization of the processing latency enhances a user's experience of the simulated environment.

Throughout the present disclosure, the term "portable electronic device" relates to portable electronic equipment that comprises hardware, software, firmware, or a combination of these, operable to implement at least a processing functionality and a rendering functionality. It will be appreciated that the processor of the portable electronic device is operable to implement the aforesaid processing functionality and the display of the portable electronic device is operable to implement the aforesaid rendering functionality. Examples of the portable electronic device include, but are not limited to, a smartphone, a phablet, a personal digital assistant (PDA).

Optionally, the display of the portable electronic device is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing® (DLP)-based display.

It is to be understood that the portable electronic device may also be referred to as a "hand-held device", "mobile device", and the like.

As mentioned previously, the display apparatus is arranged to be detachably attached and to be communicably coupled to the portable electronic device. In an implementation, the portable electronic device is mounted on (namely, attached to) the display apparatus. Optionally, in such an instance, the display apparatus supports the mounted portable electronic device thereon. In another implementation, the portable electronic device is slid into a cavity on a side of the display apparatus. Optionally, the cavity on the side of the display apparatus is shaped so as to accommodate the portable electronic device. Furthermore, optionally, the portable electronic device is attached in a manner that the display of the portable electronic device is oriented towards (namely, faces) eyes of the user, when the display apparatus is worn by the user.

It will be appreciated that the aforesaid arrangement of the display apparatus and the portable electronic device collectively constitutes a display system. Furthermore, such a display system is operable to act as a device, for example, such as a virtual reality device, for presenting the simulated environment to the user, when the display apparatus is worn by the user.

Throughout the present disclosure, the term "angular width" refers to an angular width of a given projection as seen from the user's eyes, when the display apparatus is worn by the user. Optionally, the angular width of the projection of the rendered context image is greater than 220 degrees. Furthermore, optionally, the angular width of a projection of the rendered context image is, for example, such as from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. Moreover, optionally, the angular width of a projection of the rendered focus image is, for example, such as from 5, 10, 15, 20, 25, 30, 35, 40, 45 or 50 degrees up to 15, 20, 25, 30, 35, 40, 45, 50, 55 or 60 degrees.

It is to be understood that the context image relates to a wide image of the visual scene to be rendered and projected via the display of the portable electronic device. Furthermore, the focus image relates to another image depicting a part (namely, a portion) of the visual scene, to be rendered and projected via the display apparatus. Moreover, the focus image is dimensionally smaller than the context image. Furthermore, the context and focus images collectively constitute the visual scene upon combination of projections thereof.

Throughout the present disclosure, the term 'focus display' used herein relates to a display (namely, screen) adapted to facilitate rendering of the focus image thereon. Moreover, optionally, the at least one focus display is adapted to receive a projection of the focus image thereon. Optionally, the at least one focus display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing® (DLP)-based display.

Optionally, the at least one focus display is implemented by way of at least one projector and at least one projection screen. For example, one focus display may be implemented by way of one projector and one projection screen associated with the one projector.

Throughout the present disclosure, the processor of the display apparatus is hardware, software, firmware or a combination of these, suitable for controlling operation of the display apparatus. In such an instance, the processor of the display apparatus controls operation of the display apparatus to process and display (namely, project) the focus image onto the eyes, specifically, onto fovea of the eyes of the user.

Similarly, throughout the present disclosure, the processor of the portable electronic device is hardware, software, firmware or a combination of these, suitable for controlling operation of the portable electronic device. In such an instance, the processor of the portable electronic device controls operation of the portable electronic device to process and display (namely, project) the context image onto the eyes, specifically, onto retina of the eyes of the user.

Optionally, the processing functionality (namely, processing power) of the processor of the portable electronic device is higher in comparison with processing functionality (namely, processing power) of the processor of the display apparatus.

Optionally, the processor of the display apparatus is configured to receive the focus image from the processor of the portable electronic device. Specifically, the processor of the portable electronic device is configured to communicate the focus image in a suitable format including, but not limited to, Moving Pictures Experts Group (MPEG), Joint Photographic Experts Group (JPEG), Tagged Image File Format (TIFF), Portable Network Graphics (PNG), Graphics Interchange Format (GIF), and Bitmap file format (BMP).

In an embodiment, the display apparatus further comprises means for detecting a gaze direction, wherein the processor of the display apparatus is configured to communicate the detected gaze direction to the processor of the portable electronic device, wherein the processor of the portable electronic device is configured to:

(a) obtain an input image, and use the detected gaze direction to determine a region of visual accuracy of the input image;

(b) process the input image to generate the context image and the focus image, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and (c) communicate the focus image to the processor of the display apparatus. In such an instance, the aforesaid processing functionality is implemented by the processor of the portable electronic device, beneficially, reducing processing burden on the processor of the display apparatus.

Optionally, the processor of the portable electronic device communicates the focus image to the processor of the display apparatus in a compressed format to avoid lag in processing. Subsequently, in such an instance, the processor of the display apparatus may decompress the compressed focus image prior to rendering thereof on the at least one focus display of the display apparatus.

Optionally, in this regard, the processor of the portable electronic device partially processes the focus image prior to communication thereof to the processor of the display apparatus. Optionally, the portable electronic device comprises an image sensor for capturing the input image. Optionally, in this regard, the processor of the portable communication devices performs image processing functions (for example, such as low pass filtering, colour processing, and gamma correction) on the input image.

Throughout the present disclosure, the means for detecting a gaze direction relates to specialized equipment for measuring a direction of gaze of the eye and movement of the eye. The means for detecting the gaze direction may also be referred to as "eye tracker". Examples of the means for detecting the gaze direction include, but are not limited to, contact lenses with sensors, and cameras monitoring position of pupil of the eye.

Optionally, the region of visual accuracy is a region of interest (namely, a fixation point) within the input image, and is projected onto fovea of the eye. Furthermore, the region of visual accuracy is region of focus within the input image. It will be appreciated that the region of visual accuracy relates to a region resolved to a much greater detail as compared to other regions of the input image, when the input image is viewed by a human visual system.

Optionally, the context image, generated by the processor of the portable electronic device, corresponds to a low-resolution representation of the input image. Moreover, optionally, the context image includes the region of visual accuracy of the input image along with remaining region of the input image. Specifically, size of the context image is larger than size of the focus image since the focus image corresponds to only a portion of the context image whereat the detected gaze direction of the eye is focused.

Optionally, the masking of the region of the context image is performed by the processor of the portable electronic device to hide (namely, obscure) the region of the context image corresponding to the region of visual accuracy of the input image. For example, pixels of the context image corresponding to the region of visual accuracy of the input image may be dimmed for masking.

In another embodiment, the display apparatus further comprises means for detecting a gaze direction, wherein the processor of the display apparatus is configured to:

(a) obtain an input image, and use the detected gaze direction to determine a region of visual accuracy of the input image;

(b) process the input image to generate the context image and the focus image, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and (c) communicate the context image to the processor of the portable electronic device.

Optionally, the processor of the portable electronic device is configured to receive the context image from the processor of the display apparatus.

Optionally, the display apparatus further comprises at least one optical combiner for combining the projection of the rendered context image with the projection of the rendered focus image in a manner that the projection of the rendered focus image substantially overlaps the projection of the masked region of the rendered context image. Moreover, optionally, the combined projections of the rendered context and focus images collectively constitute a projection of the input image. It will be appreciated that the context image and focus image are rendered substantially simultaneously in order to avoid time lag during combination of projections thereof.

Optionally, the at least one optical combiner comprises at least one first optical element and at least one first actuator for adjusting a location of the projection of the rendered focus image on the at least one first optical element, wherein the processor of the display apparatus is configured to control the at least one first actuator to move at least one of:

(i) the at least one focus display with respect to the at least one first optical element of the at least one optical combiner, (ii) at least one second optical element of the at least one optical combiner with respect to the at least one first optical element, the at least one second optical element being positioned on an optical path between the at least one first optical element and the at least one focus display, (iii) the at least one first optical element of the at least one optical combiner.

Optionally, the at least one first actuator moves the at least one focus display when the gaze direction of the eye shifts from one direction to another. In an example, the at least one first actuator may move the at least one focus display closer or away from the at least one first optical element. In another example, the at least one first actuator may move the at least one focus display laterally with respect to the at least one first optical element. In yet another example, the at least one first actuator may tilt and/or rotate the at least one focus display with respect to the at least one first optical element. Moreover, optionally, the processor of the display apparatus controls the at least one first actuator by generating an actuation signal (for example, such as electric current, hydraulic pressure, and so forth).

Optionally, the at least one second optical element changes the optical path of the projection of the rendered focus image on the at least one first optical element in order to facilitate projection of the rendered focus image on and around the fovea of the eye even on occurrence of shift in the gaze direction.

Optionally, the at least one first actuator moves the at least one first optical element to combine optical paths of the projections of the rendered context and focus images. It will be appreciated that such arrangement of the at least one first optical element facilitates projection of the rendered focus image on and around the fovea of the eye, and projection of the rendered context image is projected on a retina of the eye, of which the fovea is just a small part. In an embodiment, the at least one first optical element of the at least one optical combiner is implemented by way of at least one of: a semi-transparent mirror, a semi-transparent film, a prism, a polarizer, an optical waveguide.

Optionally, the display apparatus further comprises at least one focusing lens that is positioned on an optical path between the at least one first optical element and the at least one focus display, and at least one second actuator for moving the at least one focusing lens with respect to the at least one focus display. In such an embodiment, the processor of the display apparatus is configured to control the at least one second actuator to adjust a focus of the projection of the rendered focus image. Moreover, optionally, the at least one focusing lens utilizes properties thereof to adjust the focus of the projection of the rendered focus image by changing the optical path thereof. Furthermore, optionally, the at least one second actuator is controlled by the processor of the display apparatus to adjust the focus of the projection of rendered focus image on the at least one first optical element. In another embodiment, the processor of the portable electronic device is configured to control the at least one second actuator to adjust a focus of the projection of the rendered focus image.

The present description also relates to the method as described above. The various embodiments and variants disclosed above apply mutatis mutandis to the method.

DETAILED DESCRIPTION OF THE DRAWINGS

Figure 1:
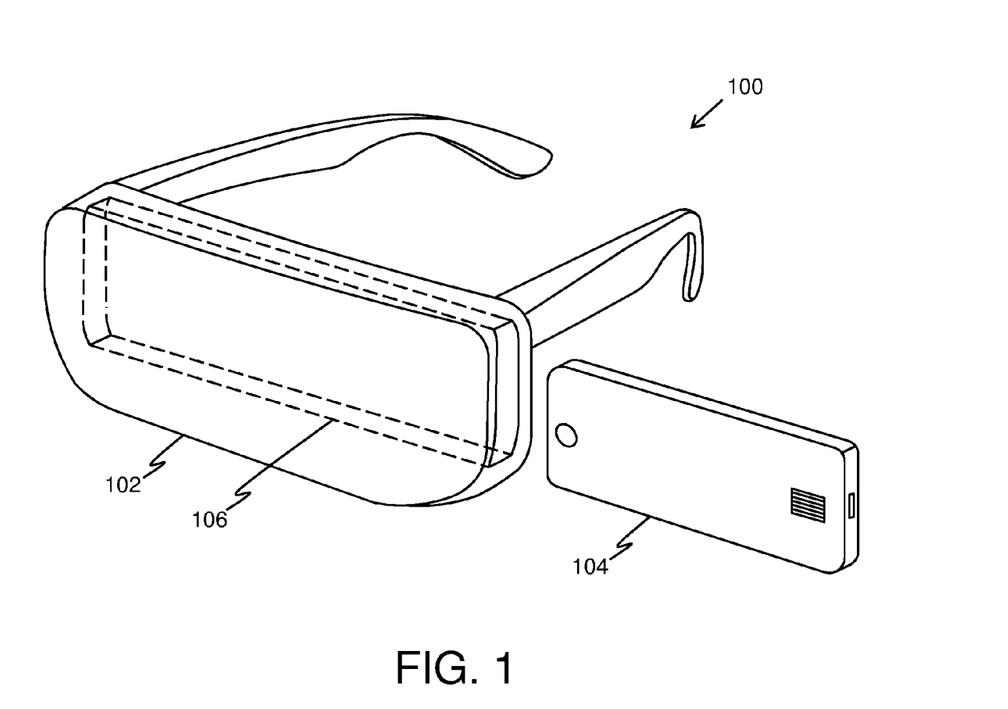
FIG. 1 is a schematic illustration of a display system comprising a display apparatus and a portable electronic device, in accordance with an embodiment of the present disclosure.

Referring to FIG. 1, illustrated is a schematic illustration of a display system 100 comprising a display apparatus 102 and a portable electronic device 104, in accordance with an embodiment of the present disclosure. The display apparatus 102 is arranged to be detachably attached to a portable electronic device 104 and to be communicably coupled with the portable electronic device 104. Specifically, the portable electronic device 104 is arranged in a cavity 106 of the display apparatus 102. Furthermore, the display system 100 is operable to act as a device, for example, such as a virtual reality device, for presenting a simulated environment to a user, when the display apparatus 102 is worn by the user.

It may be understood by a person skilled in the art that the FIG. 1 includes simplified arrangement for implementation of the display system 100 for sake of clarity, which should not unduly limit the scope of the claims herein. The person skilled in the art will recognize many variations, alternatives, and modifications of embodiments of the present disclosure.

Figure 2:
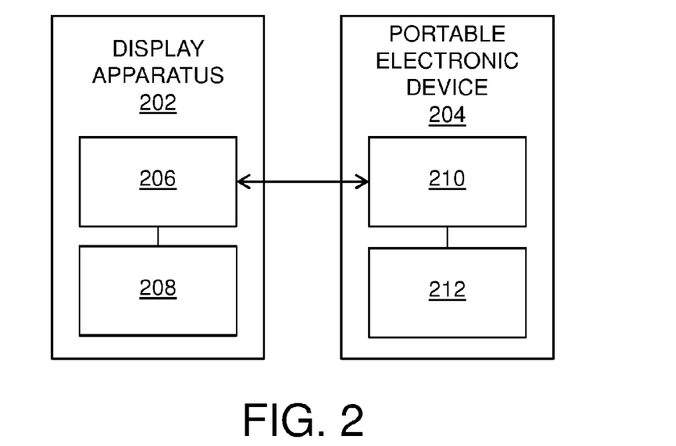
FIGS. 2 and 3 are block diagrams of architectures of a display apparatus and a portable electronic device, in accordance with different embodiments of the present disclosure.

Referring to FIG. 2, illustrated is a block diagram of architecture of a display apparatus 202 and a portable electronic device 204, in accordance with an embodiment of the present disclosure. As shown, the display apparatus 202 comprises at least one focus display 206, and a processor 208 coupled to the at least one focus display 206. The display apparatus 202 is arranged to be detachably attached to a portable electronic device 204 and to be communicably coupled with the portable electronic device 104. Furthermore, the portable electronic device 204 comprises a processor 210 configured to render a context image at a display 212 of the portable electronic device 204.

Figure 3:
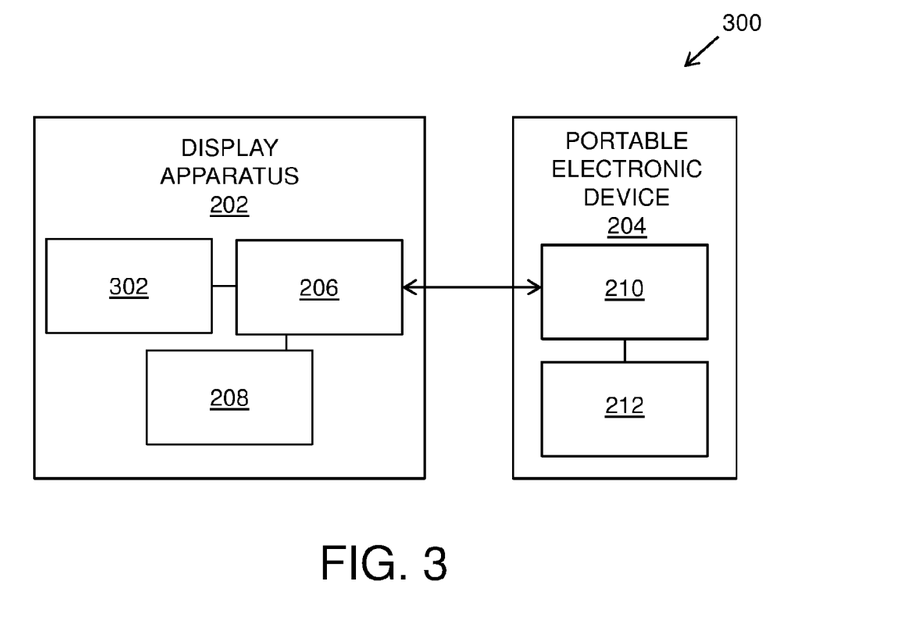

Referring to FIG. 3, illustrated is a block diagram of architecture of a display apparatus 302 and a portable electronic device 304, in accordance with another embodiment of the present disclosure. The display apparatus 302 comprises at least one focus display 306, and a processor 308 coupled to the at least one focus display 306. The display apparatus 302 further comprises means for detecting a gaze direction 310. The display apparatus 302 is arranged to be detachably attached to a portable electronic device 304 and to be communicably coupled with the portable electronic device 304. Furthermore, as shown, the portable electronic device 304 comprises a processor 312 configured to render a context image at a display 314 of the portable electronic device 304.

Figure 4:
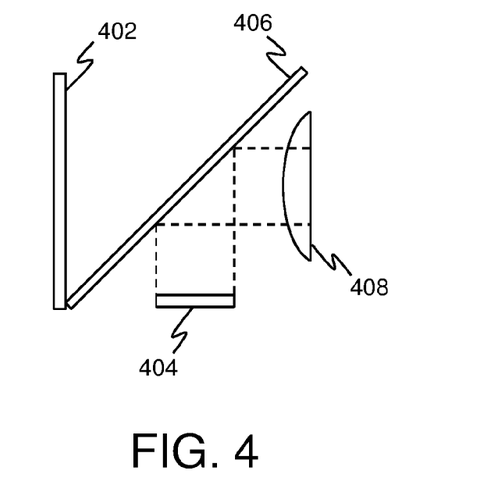
FIG. 4 is an exemplary implementation of a display system, in accordance with an embodiment of the present disclosure.

Referring to FIG. 4, illustrated is an exemplary implementation of a display system (such as the display system 100, shown in FIG. 1), in accordance with an embodiment of the present disclosure. The display system is shown to include a display 402 of a portable electronic device (such as the portable electronic device 104 of FIG. 1) to render a context image, at least one focus display 404 of a display apparatus (such as the display apparatus 102 of FIG. 1) to render a focus image, and at least one optical combiner 406. Furthermore, at least one focusing lens 408 is positioned on an optical path of projections of the context and focus images. The at least one focusing lens 408 is one of an enlarging or a shrinking (namely, reducing) lens.

Figure 5:
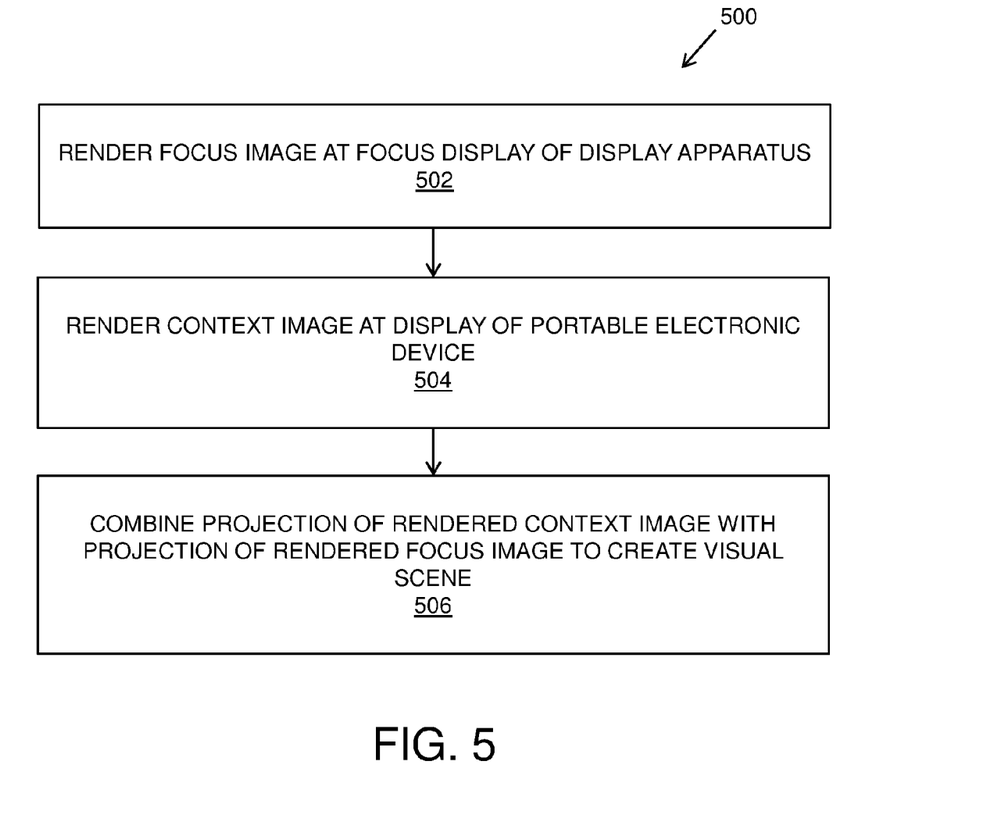
FIG. 5 illustrates steps of a method of displaying via the display apparatus, in accordance with an embodiment of the present disclosure.

Referring to FIG. 5, illustrated are steps of a method 500 of displaying via the display apparatus 102, in accordance with an embodiment of the present disclosure. At step 502, a focus image is rendered at, at least one focus display of the display apparatus, wherein an angular width of a projection of the rendered focus image ranges from 5 degrees to 60 degrees. At step 504, a context image is rendered at a display of the portable electronic device, wherein an angular width of a projection of the rendered context image ranges from 40 degrees to 220 degrees. At step 506, the projection of the rendered context image is combined with the projection of the rendered focus image to create a visual scene.

The steps 502 to 506 are only illustrative and other alternatives can also be provided where one or more steps are added, one or more steps are removed, or one or more steps are provided in a different sequence without departing from the scope of the claims herein. For example, the method 500 further comprises receiving, at the display apparatus, the focus image from the portable electronic device. In an example, wherein the display apparatus further comprises means for detecting a gaze direction, and wherein the method 500 further comprises detecting, at the display apparatus, a gaze direction, communicating the detected gaze direction to the portable electronic device, obtaining an input image at the portable electronic device, and using the detected gaze direction to determine a region of visual accuracy of the input image, processing the input image to generate the context image and the focus image at the portable electronic device, the context image having a first resolution and the focus image having a second resolution, wherein a region of the context image that substantially corresponds to the region of visual accuracy of the input image is masked, the focus image substantially corresponds to the region of visual accuracy of the input image, and the second resolution is higher than the first resolution, and communicating the focus image from the portable electronic device to the display apparatus. In another example, wherein the display apparatus further comprises means for detecting a gaze direction, and wherein the method 500 further comprises detecting a gaze direction, obtaining an input image at the display apparatus, and using the detected gaze direction to determine a region of visual accuracy of the input image, processing the input image to generate the context image and the focus image at the display apparatus, the context image having a first resolution and the focus image having a second resolution, wherein a region of the context image that substantially corresponds to the region of visual accuracy of the input image is masked, the focus image substantially corresponds to the region of visual accuracy of the input image, and the second resolution is higher than the first resolution, and communicating the context image from the display apparatus to the portable electronic device. In one example, the method 500 further comprises using at least one optical combiner of the display apparatus to combine the projection of the rendered context image with the projection of the rendered focus image in a manner that the projection of the rendered focus image substantially overlaps the projection of the masked region of the rendered context image. In another example, the at least one optical combiner comprises at least one first optical element, and wherein the method 500 further comprises adjusting a location of the projection of the rendered focus image on the at least one first optical element, the adjusting being performed by controlling at least one first actuator of the at least one optical combiner to move at least one of the at least one focus display with respect to the at least one first optical element of the at least one optical combiner, at least one second optical element of the at least one optical combiner with respect to the at least one first optical element, the at least one second optical element being positioned on an optical path between the at least one first optical element and the at least one focus display, the at least one first optical element of the at least one optical combiner.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:
1. A display apparatus comprising:
   at least one focus display;
   a processor coupled to the at least one focus display, wherein the processor is configured to render a focus image at the at least one focus display, wherein an angular width of a projection of the rendered focus image ranges from 5 degrees to 60 degrees,
wherein the display apparatus is arranged to be detachably attached to a portable electronic device and to be communicably coupled with the portable electronic device, and wherein a processor of the portable electronic device is configured to render a context image at a display of the portable electronic device, wherein an angular width of a projection of the rendered context image ranges from 40 degrees to 220 degrees, means for detecting a gaze direction, wherein the processor of the display apparatus is configured to communicate the detected gaze direction to the processor of the portable electronic device; wherein the processor of the portable electronic device is configured to:

(a) obtain an input image, and use the detected gaze direction to determine a region of visual accuracy of the input image;

(b) process the input image to generate the context image and the focus image, the context image having a first resolution and the focus image having a second resolution, wherein:
  (i) a region of the context image that substantially corresponds to the region of visual accuracy of the input image is masked,
  (ii) the focus image substantially corresponds to the region of visual accuracy of the input image, and
  (iii) the second resolution is higher than the first resolution; and (c) communicate the focus image to the processor of the display apparatus; and wherein the projection of the rendered context image is combined with the projection of the rendered focus image to create a visual scene.

2. The display apparatus of claim 1, wherein the processor of the display apparatus is configured to receive the focus image from the processor of the portable electronic device.

3. A display apparatus comprising:
  at least one focus display;
  a processor coupled to the at least one focus display, wherein the processor is configured to render a focus image at the at least one focus display, wherein an angular width of a projection of the rendered focus image ranges from 5 degrees to 60 degrees,
wherein the display apparatus is arranged to be detachably attached to a portable electronic device and to be communicably coupled with the portable electronic device, and wherein a processor of the portable electronic device is configured to render a context image at a display of the portable electronic device, wherein an angular width of a projection of the rendered context image ranges from 40 degrees to 220 degrees, further comprising means for detecting a gaze direction, wherein the processor of the display apparatus is configured to:

(a) obtain an input image, and use the detected gaze direction to determine a region of visual accuracy of the input image;

(b) process the input image to generate the context image and the focus image, the context image having a first resolution and the focus image having a second resolution, wherein:
  (i) a region of the context image that substantially corresponds to the region of visual accuracy of the input image is masked,
  (ii) the focus image substantially corresponds to the region of visual accuracy of the input image, and
  (iii) the second resolution is higher than the first resolution; and (c) communicate the context image to the processor of the portable electronic device; and wherein the projection of the rendered context image is combined with the projection of the rendered focus image to create a visual scene.

4. The display apparatus of claim 1, further comprising at least one optical combiner for combining the projection of the rendered context image with the projection of the rendered focus image in a manner that the projection of the rendered focus image substantially overlaps the projection of the masked region of the rendered context image.

5. The display apparatus of claim 4, wherein the at least one optical combiner comprises at least one first optical element and at least one first actuator for adjusting a location of the projection of the rendered focus image on the at least one first optical element, wherein the processor of the display apparatus is configured to control the at least one first actuator to move at least one of:
  (i) the at least one focus display with respect to the at least one first optical element of the at least one optical combiner,
  (ii) at least one second optical element of the at least one optical combiner with respect to the at least one first optical element, the at least one second optical element being positioned on an optical path between the at least one first optical element and the at least one focus display,
  (iii) the at least one first optical element of the at least one optical combiner.

6. The display apparatus of claim 5, further comprising:
  at least one focusing lens that is positioned on an optical path between the at least one first optical element and the at least one focus display; and
  at least one second actuator for moving the at least one focusing lens with respect to the at least one focus display,
wherein the processor of the display apparatus is configured to control the at least one second actuator to adjust a focus of the projection of the rendered focus image.

7. The display apparatus of claim 1, wherein the at least one focus display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing (DLP)-based display.

8. The display apparatus of claim 1, wherein the at least one focus display is implemented by way of at least one projector and at least one projection screen.

9. A method of displaying, via a display apparatus comprising at least one focus display, the display apparatus being detachably attached to a portable electronic device and being communicably coupled with the portable electronic device, the method comprising:
  rendering a focus image at the at least one focus display of the display apparatus, wherein an angular width of a projection of the rendered focus image ranges from 5 degrees to 60 degrees;
  rendering a context image at a display of the portable electronic device, wherein an angular width of a projection of the rendered context image ranges from 40 degrees to 220 degrees; and
  combining the projection of the rendered context image with the projection of the rendered focus image to create a visual scene; and
wherein the display apparatus further comprises means for detecting a gaze direction, and wherein the method further comprises:
  detecting, at the display apparatus, a gaze direction;
  communicating the detected gaze direction to the portable electronic device;

obtaining an input image at the portable electronic device, and using the detected gaze direction to determine a region of visual accuracy of the input image;

processing the input image to generate the context image and the focus image at the portable electronic device, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and communicating the focus image from the portable electronic device to the display apparatus.

10. The method of claim 9, further comprising receiving, at the display apparatus, the focus image from the portable electronic device.

11. A method of displaying, via a display apparatus comprising at least one focus display, the display apparatus being detachably attached to a portable electronic device and being communicably coupled with the portable electronic device, the method comprising:

rendering a focus image at the at least one focus display of the display apparatus, wherein an angular width of a projection of the rendered focus image ranges from 5 degrees to 60 degrees;

rendering a context image at a display of the portable electronic device, wherein an angular width of a projection of the rendered context image ranges from 40 degrees to 220 degrees; and combining the projection of the rendered context image with the projection of the rendered focus image to create a visual scene; and, wherein the display apparatus further comprises means for detecting a gaze direction, and wherein the method further comprises:

detecting a gaze direction;

obtaining an input image at the display apparatus, and using the detected gaze direction to determine a region of visual accuracy of the input image;

processing the input image to generate the context image and the focus image at the display apparatus, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and communicating the context image from the display apparatus to the portable electronic device.

12. The method of claim 9, further comprising using at least one optical combiner of the display apparatus to combine the projection of the rendered context image with the projection of the rendered focus image in a manner that the projection of the rendered focus image substantially overlaps the projection of the masked region of the rendered context image.

13. The method of claim 12, wherein the at least one optical combiner comprises at least one first optical element, and wherein the method further comprises adjusting a location of the projection of the rendered focus image on the at least one first optical element, the adjusting being performed by controlling at least one first actuator of the at least one optical combiner to move at least one of:

(i) the at least one focus display with respect to the at least one first optical element of the at least one optical combiner, (ii) at least one second optical element of the at least one optical combiner with respect to the at least one first optical element, the at least one second optical element being positioned on an optical path between the at least one first optical element and the at least one focus display, (iii) the at least one first optical element of the at least one optical combiner.

* * * * *